United States Patent
Huang et al.

(10) Patent No.: US 7,049,800 B2
(45) Date of Patent: May 23, 2006

(54) SWITCHING MODE VOLTAGE REGULATOR AND METHOD THEREOF

(75) Inventors: Jian-Rong Huang, Hsinchu (TW); Liang-Pin Tai, Tainan (TW); Hung-I Wang, Changhua (TW); Chung-Lung Pai, Taipei (TW); Jing-Mong Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 295 days.

(21) Appl. No.: 10/743,915

(22) Filed: Dec. 24, 2003

(65) Prior Publication Data
US 2004/0135564 A1    Jul. 15, 2004

(30) Foreign Application Priority Data
Jan. 2, 2003  (TW) .............................. 92100073 A

(51) Int. Cl.
*G05F 1/40*  (2006.01)
(52) U.S. Cl. ....................................... 323/282; 323/271
(58) Field of Classification Search ................ 323/222, 323/223, 265, 266, 268, 271, 273, 282, 283, 323/285
See application file for complete search history.

(56) References Cited

U.S. PATENT DOCUMENTS

| | | | | |
|---|---|---|---|---|
| 5,414,341 A | * | 5/1995 | Brown ........................ | 323/268 |
| 6,084,450 A | * | 7/2000 | Smith et al. ................. | 327/172 |
| 6,307,356 B1 | * | 10/2001 | Dwelley ..................... | 323/282 |
| 6,476,589 B1 | * | 11/2002 | Umminger et al. ......... | 323/282 |
| 6,724,174 B1 | * | 4/2004 | Esteves et al. .............. | 323/224 |

* cited by examiner

*Primary Examiner*—Matthew V. Nguyen
(74) *Attorney, Agent, or Firm*—Rosenberg, Klein & Lee

(57) ABSTRACT

A switching mode voltage regulator comprises a pulse width modulator and an adjustable one-shot circuit to generate an adjustable signal based on an input voltage, an adjustable voltage, and a PWM signal from the pulse width modulator at light loading to switch a high-side switch of an output stage in the voltage regulator. The ON duty of the adjustable signal is controlled by the adjustable voltage, such that it will be larger than that of the PWM signal and as a result, the number of switching the switch of the output stage is decreased, thereby reducing the switching loss and improving the efficiency of the voltage regulator.

24 Claims, 7 Drawing Sheets

SWITCHING MODE VOLTAGE REGULATOR AND METHOD THEREOF

FIELD OF THE INVENTION

The present invention relates generally to a switching mode voltage regulator, and more particularly, to an efficiency improvement of a switching mode voltage regulator and method thereof.

BACKGROUND OF THE INVENTION

FIG. 1 shows a schematic diagram of a conventional synchronous switching mode voltage regulator 10, which comprises an output stage 12 connected between an input voltage $V_{in}$ and ground GND to generate an output voltage $V_{out}$, and a pulse width modulator (PWM) 14 responsive to the output voltage $V_{out}$ to generate a PWM signal $P_1$ by which the output stage 12 is driven. The output stage 12 includes a high-side switch 122 connected between the input voltage $V_{in}$ and a phase node 124, and a low-side switch 126 connected between the phase node 124 and ground GND. The pulse width modulator 14 has an error amplifier 142 to generate an error signal $S_{EA}$ by comparing the output voltage $V_{out}$ with a reference voltage $V_{REF}$, and a PWM comparator 144 connected with the error signal $S_{EA}$ and a ramp signal $S_{RAMP}$ to generate a PWM signal $P_1$, by which the high-side switch 122 and low-side switch 126 are turned on/off. When the output voltage $V_{out}$ is decreased, the ON duty of the PWM signal $P_1$ is increased so as to increase the ON time of the high-side switch 122, and thereby raising the output voltage $V_{out}$ to the desired value. The circuit 10 has advantages of high efficiency and rapid response at high and moderate loadings. However, the efficiency of the circuit 10 may be decreased due to the power consumption caused by the fact that the inductor current $I_L$ flowing toward the low-side switch 126 as a result of the decreased frequency and the reduced ON duty at light loading, for example at idle mode.

Efficiency is important for the PWM regulator, particularly for portable apparatus applications. However, the efficiency of a typical switching mode regulator may be decreased as its loading is reduced, this is due to the fact that a constant amount of the power is wasted in the switching drive circuit thereof, being independent of the magnitude of the loading thereon. For the improvement of the efficiency, a switching mode voltage regulator disclosed by U.S. Pat. No. 6,307,356 issued to Dwelley employs a fixed minimum non-zero duty cycle generator to generate a signal at the idle mode with an ON duty wider than that of the PWM signal for switching the high-side switch, so as to avoid the current flowing toward the low-side switch from the inductor and thereby without the reduction in the efficiency of the regulator circuit. However, according to the second law of voltage balance $$\Delta I_L = (V_{in} - V_{out}) \times T_{ON}/L = V_{out} \times T_{OFF}/L,$$

where $\Delta I_L$ is the variation of the inductor current $I_L$, $T_{ON}$ is the ON time of the high-side switch, $T_{OFF}$ is the OFF time of the high-side switch, and L is the inductance of the inductor. The variation $\Delta I_L$ of the inductor current $I_L$ will be decreased if the difference $(V_{in} - V_{out})$ is decreased while the ON time $T_{ON}$ remains unchanged. Furthermore, the OFF time $T_{OFF}$ will be decreased with the almost unchanged output voltage $V_{out}$, and then the number of the switching in the switching circuit will be increased, thereby causing the increased switching loss, and the decreased efficiency will be effected. Such a problem also occurs in an asynchronous switching mode voltage regulator.

Therefore, it is desired improved efficiency for a switching mode voltage regulator and method thereof.

SUMMARY OF THE INVENTION

It is an object of the present invention to propose an asynchronous switching mode voltage regulator and method thereof for improved efficiency at light loading.

It is another object of the present invention to propose a synchronous switching mode voltage regulator and method thereof for improved efficiency at light loading.

According to the present invention, an asynchronous switching mode voltage regulator comprises an output stage connected between an input voltage and ground to generate an output voltage, a pulse width modulator responsive to the output voltage to generate a PWM signal, and an adjustable one-shot circuit to generate an adjustable signal based on an adjustable voltage and the PWM signal at light loading. The output stage includes a switch connected between the input voltage and a phase node, and a unidirectional current-conducting device connected between the phase node and ground, and the switch is switched by the adjustable signal at light loading. The adjustable signal has a wider ON duty than that of the PWM signal, such that the number of switching the switch is decreased and as a result, the switching loss is reduced, thereby improving the efficiency of the voltage regulator.

In a synchronous switching mode voltage regulator, according to the present invention, an output stage connected between an input voltage and ground to generate an output voltage includes a high-side switch connected between the input voltage and a phase node, and a low-side switch connected between the phase node and ground, a pulse width modulator generates a PWM signal in response to the output voltage to modulate the high-side and low-side switches, a phase detector detects the voltage on the phase node to generate a detection signal at light loading to block the low-side switch and to control an adjustable one-shot circuit that generates an adjustable signal to switch the high-side switch based on the PWM signal as well as an adjustable voltage, and an OFF duty detector detects the adjustable signal to reset the phase detector. Again, the adjustable signal has a wider ON duty than that of the PWM signal, such that the number of switching the switches of the output stage is decreased and as a result, the switching loss is reduced, thereby improving the efficiency of the voltage regulator.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
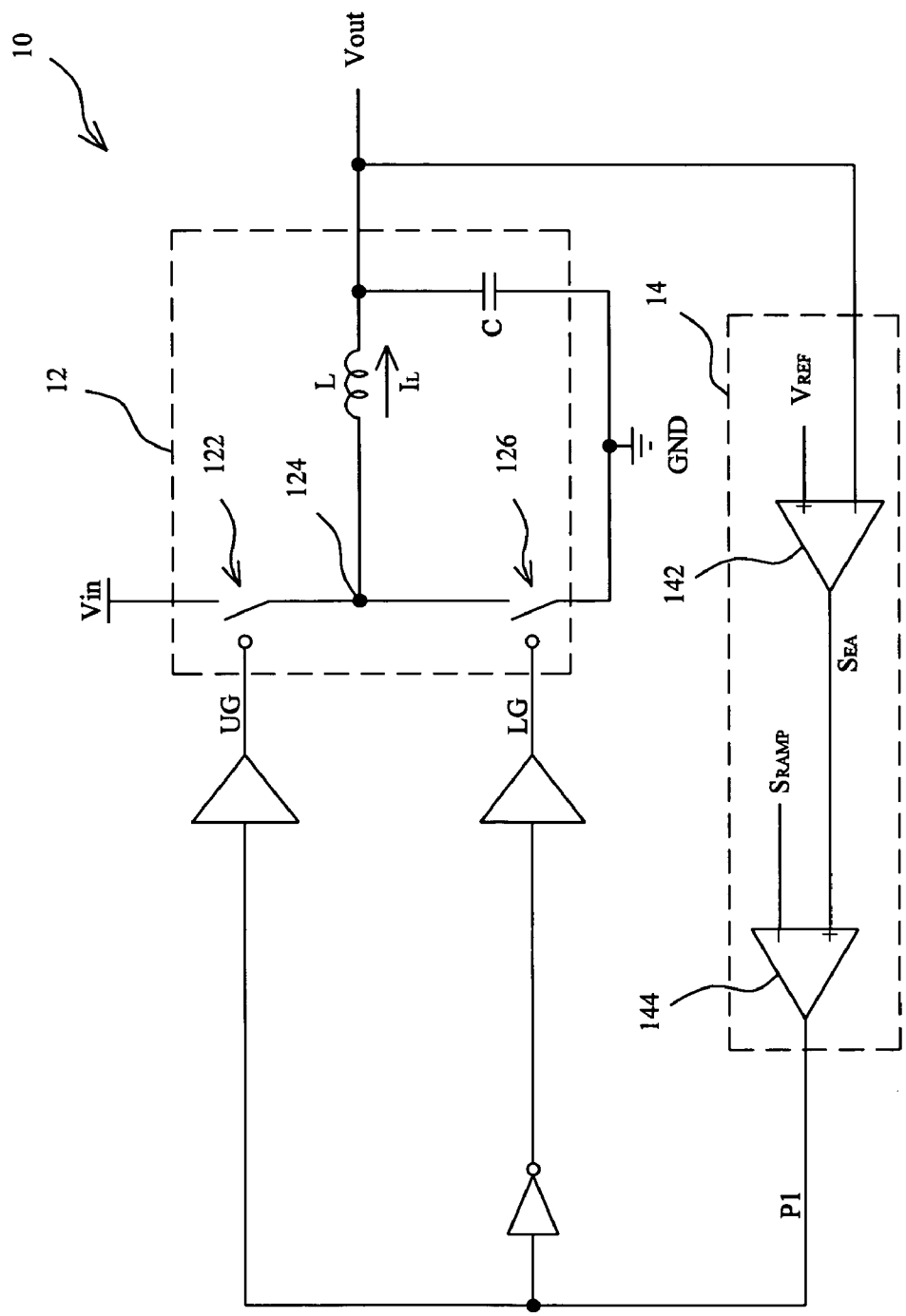
FIG. 1 shows a schematic diagram of a conventional synchronous switching mode voltage regulator.
Figure 2:
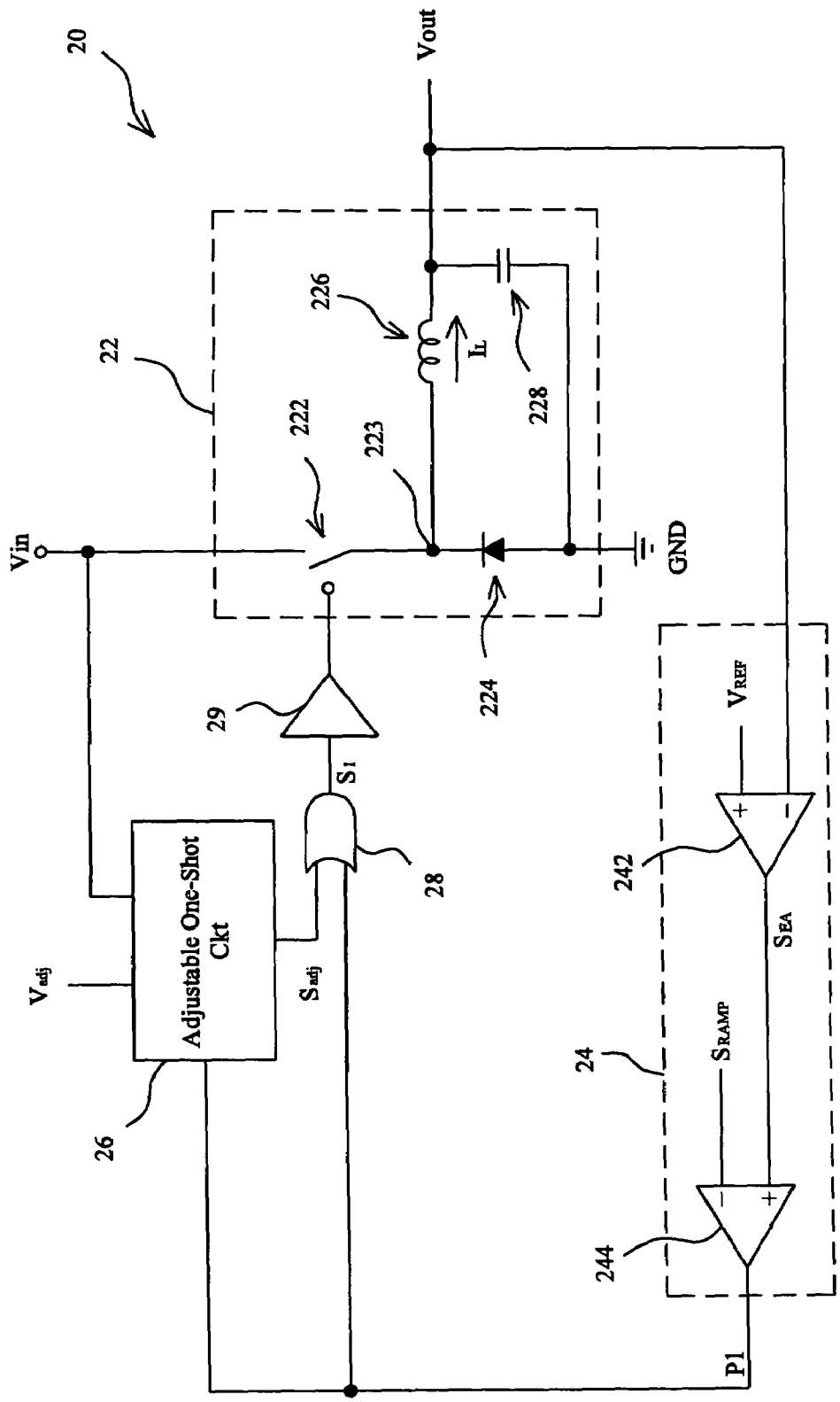
FIG. 2 shows a schematic diagram of an asynchronous switching mode voltage regulator according to the present invention.

FIG. 2 shows an asynchronous switching mode voltage regulator 20 according to the present invention, which comprises an output stage 22 connected between an input voltage $V_{in}$ and ground GND to generate an output voltage $V_{out}$. The output stage 22 includes a switch 222 connected between the input voltage $V_{in}$ and a phase node 223, a diode 224 connected between the phase node 223 and ground GND, an inductor 226 connected between the phase node 223 and the output terminal $V_{out}$, and a capacitor 228 connected between the output terminal $V_{out}$ and ground GND. A pulse width modulator 24 responsive to the output voltage $V_{out}$ generates a PWM signal $P_1$ to switch the switch 222 of the output stage 22 so as to modulate the output voltage $V_{out}$. The pulse width modulator 24 includes an error amplifier 242 having a negative input connected with the output voltage $V_{out}$ as well as a non-negative input connected with a reference voltage $V_{REF}$ so as to generate an error signal $S_{EA}$, and a PWM comparator 244 having a non-negative input connected with the error signal $S_{EA}$ as well as a negative input connected with a ramp signal $S_{RAMP}$ so as to generate the PWM signal $P_1$. An adjustable one-shot circuit 26 is connected with the input voltage $V_{in}$, an adjustable voltage $V_{adj}$, and the PWM signal $P_1$, so as to generate an adjustable signal $S_{adj}$ that is ORed with the PWM signal $P_1$ by an OR gate 28 to generate a control signal $S_1$ for a driver 29 to generate a driving signal to switch the switch 222 of the output stage 22. Preferably, the adjustable voltage $V_{adj}$ for the adjustable one-shot circuit 26 is derived from the output voltage $V_{out}$.

Figure 3:
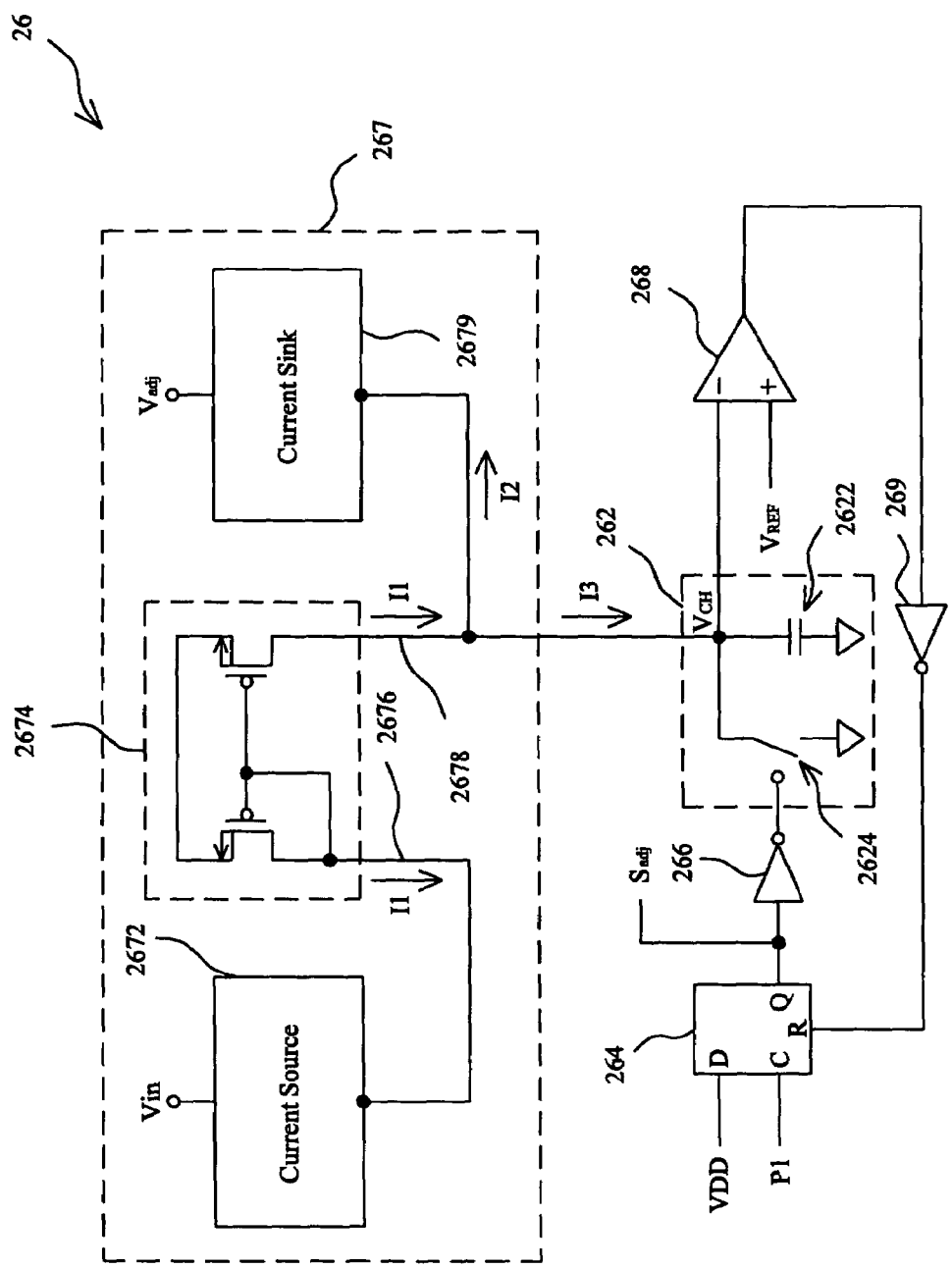
FIG. 3 shows one embodiment for the adjustable one-shot circuit shown in FIG. 2.

As shown in FIG. 3, the adjustable one-shot circuit 26 shown in FIG. 2 includes a charger 262 having a capacitor 2622 connected with a switch 2624 in parallel, a D-type flip-flop 264 having an input D connected with a supply voltage VDD, another input C connected with the PWM signal $P_1$, a reset input R, and an output Q connected to the charger 262 with an inverter 266, a charging current generator 267 providing a charging current $I_3$ to the charger 262, and a comparator 268 having a non-negative input connected with the reference voltage $V_{REF}$, a negative input connected with the charger output $V_{CH}$, and an output connected to the reset input R of the flip-flop 264 with an inverter 269. The charging current generator 267 includes a current source 2672 connected to the input voltage $V_{in}$ to generate a current $I_1$ in proportional to the input voltage $V_{in}$, a current mirror 2674 having a reference branch 2676 connected with the current $I_1$ and a mirror branch 2678 to mirror the current $I_1$, and a current sink 2679 connected with the adjustable voltage $V_{adj}$ and the mirror branch 2678. The charging current $I_3$ is determined by the current sink 2679 that separates a current $I_2$ from the mirrored current $I_1$, and the sink current $I_2$ is preferably proportional to the adjustable voltage $V_{adj}$. The current sink 2679 may be realized by conventional current divider or the like.

Figure 4:
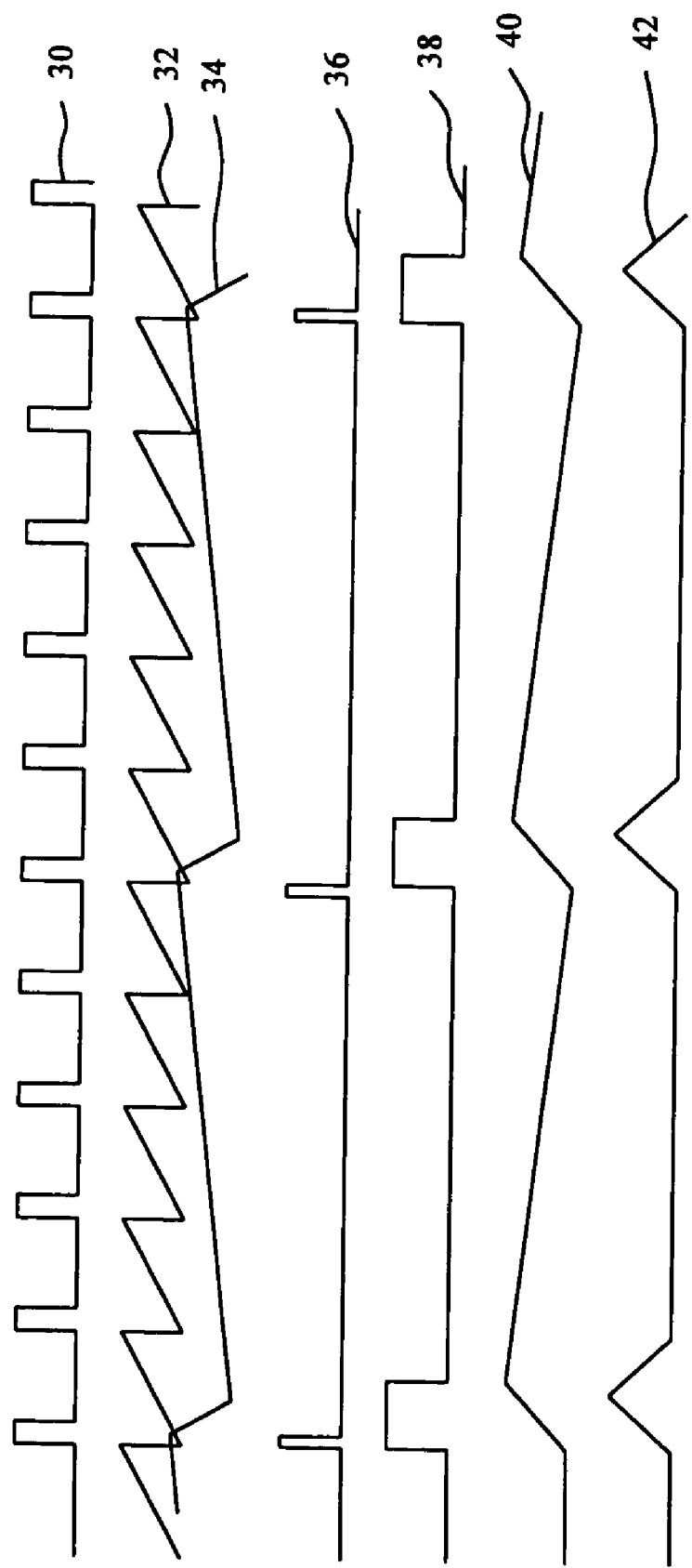
FIG. 4 shows a timing diagram of various signals of the voltage regulator shown in FIG. 2 at light loading.

Referring to FIGS. 2–4, the timing diagram shown in FIG. 4 illustrates various signals of the regulator circuit 20 shown in FIG. 2 at light loading, in which waveform 30 shows the clock at which the regulator 20 operates, waveform 32 shows the error signal $S_{EA}$, waveform 34 shows the ramp signal $S_{RAMP}$, waveform 36 shows the PWM signal $P_1$, waveform 38 shows the adjustable signal $S_{adj}$, waveform 40 shows the output voltage $V_{out}$, and waveform 42 shows the current $I_L$ flowing through the inductor. As the regulator 20 enters into a light loading, only a small part of the error signal $S_{EA}$ overlaps to the ramp signal $S_{RAMP}$, as shown by the waveforms 32 and 34, which causes the PWM signal $P_1$ thus generated to have an extremely narrow width, as shown by the waveform 36. The state table of the D-type flip-flop 264 shown in FIG. 3 is listed in Table 1:

TABLE 1

| R | C | Q |
|---|---|---|
| 1 | X | 0 |
| 0 | 0 | 0 |
| 0 | 1 | 0 |
| 0 | 1→0 | 0 |
| 0 | 0→1 | D |

From Table 1, it is shown that, on receiving the PWM signal $P_1$, the D-type flip-flop 264 of the adjustable one-shot circuit 26 is triggered to generate its output D only when its input C is transferred from "0" to "1". In other words, only at the pulse rising edge of the PWM signal $P_1$, the D-type flip-flop 264 is triggered to generate a high-level voltage for example VDD at its output Q. The switch 2624 of the charger 262 is opened by the high-level voltage of the output Q after it is inversed by the inverter 266, such that the charging current $I_3$ starts to charge the capacitor 2622 of the charger 262 so as to generate a charger output voltage $V_{CH}$. Once the charger output voltage $V_{CH}$ reaching the reference voltage $V_{REF}$, the comparator 268 will output a signal which, further inversed by the inverter 269, will reset the D-type flip-flop 264, resulting in the adjustable signal $S_{adj}$ at the output Q of the D-type flip-flop 264, as illustrated by the waveform 38 in FIG. 4, and simultaneously the switch 2624 will be closed to cause the capacitor 262 discharged since the output Q of the D-type flip-flop 264 is reset and is no longer at the high-level voltage. Then, as shown in FIG. 2, the PWM signal $P_1$ and adjustable signal $S_{adj}$ are ORed by the OR gate 28 to generate the control signal $S_1$ for the driver 29, by which the driving signal is generated instead to switch the high-side switch 222 so as to modulate the output voltage $V_{out}$, as shown by the waveform 40 in FIG. 4. The pulse width of the adjustable signal $S_{adj}$ is determined by the charging time of the capacitor 2622. If it is desired to have an increased charging time, the charging current $I_3$ should be reduced, and if it is intended to have a reduced charging current $I_3$, only increasing the voltage $V_{adj}$ is needed, due to the fact that $I_3=I_1-I_2$ and $I_2$ is proportional to the adjustable voltage $V_{adj}$. On the contrary, the desired decreased charging time is obtained by the increased charging current $I_3$ caused by decreasing the voltage $V_{adj}$.

According to the second law of voltage balance $$\Delta I_L = (V_{in} - V_{out}) \times T_{ON}/L = V_{out} \times T_{OFF}/L,$$

as the voltage difference $(V_{in}-V_{out})$ decreases, the adjustable voltage $V_{adj}$ may be increased to further increase the ON time $T_{ON}$ of the regulator 20, due to the non-constant ON time $T_{ON}$ controlled by the adjustable voltage $V_{adj}$, such that both the variation $\Delta I_L$ of the inductor current $I_L$ and thus the OFF time $T_{OFF}$ remain unchanged. Therefore, the number of switching the high-side switch 222 will be decreased and as a result, the switching loss is reduced to result in the regulator with much higher efficiency.

Figure 5:
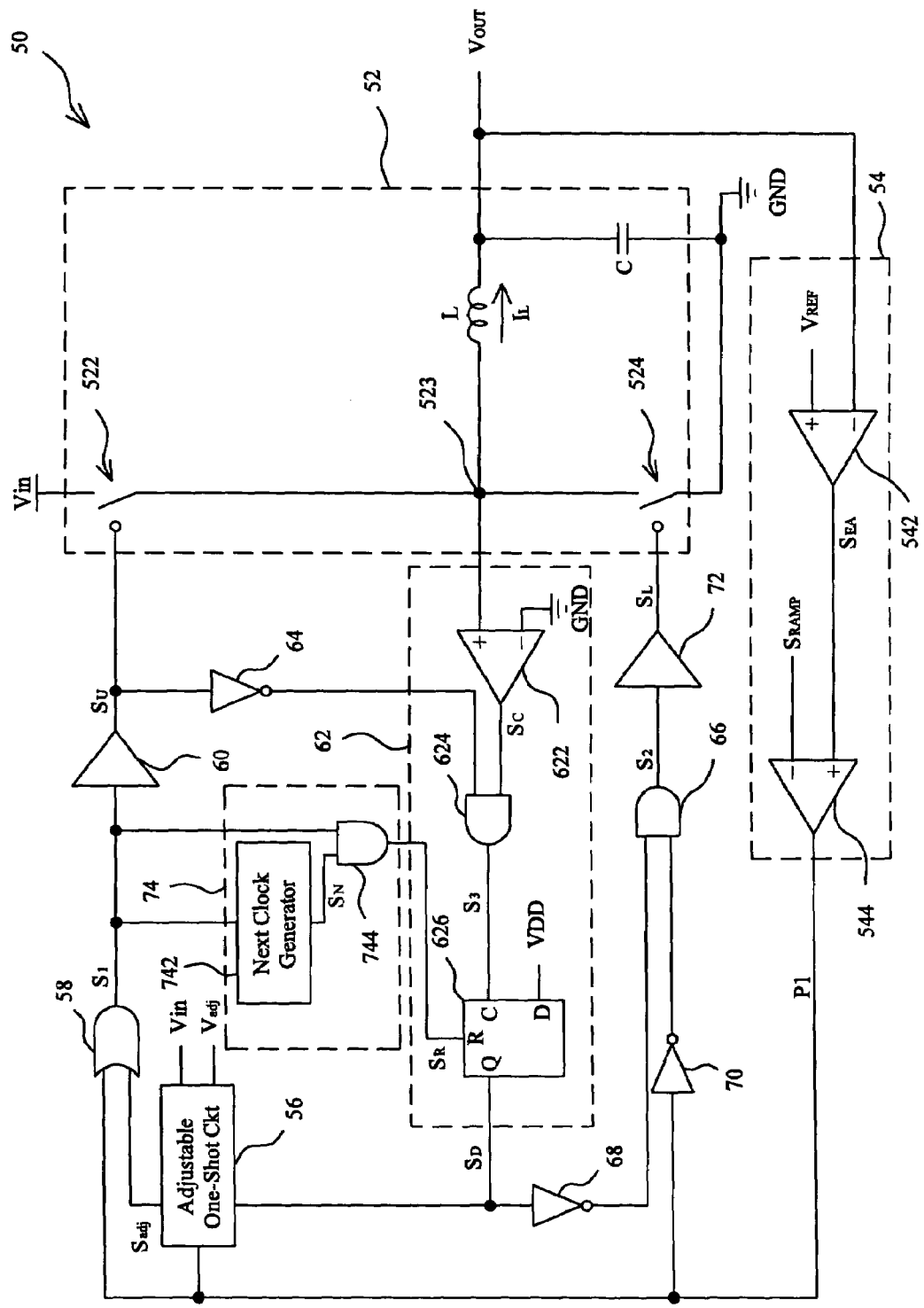
FIG. 5 shows a schematic diagram of a synchronous switching mode voltage regulator according to the present invention.

A synchronous switching mode voltage regulator 50 according to the present invention is shown in FIG. 5, which comprises an output stage 52 connected between an input voltage $V_{in}$ and ground GND to generate an output voltage $V_{out}$, and the output stage 52 includes a high-side switch 522 connected between the input voltage $V_{in}$ and a phase node 523, and a low-side switch 524 connected between the phase node 523 and ground GND. A pulse width modulator 54 generates a PWM signal $P_1$ in response to the output voltage $V_{out}$, and an adjustable one-shot circuit 56 generates an adjustable signal $S_{adj}$ based on the PWM signal $P_1$, input voltage $V_{in}$, and an adjustable voltage $V_{adj}$. The adjustable voltage $V_{adj}$ is further ORed with the PWM signal $P_1$ by an OR gate 58 to generate a control signal $S_1$ for a high-side driver 60 to generate a driving signal $S_U$ to switch the high-side switch 522. A phase detector 62 detects the voltage on the phase node 523 and receives the driving signal $S_U$ through an inverter 64, so as to generate a detection signal $S_D$, an AND gate 66 receives the detection signal $S_D$ and PWM signal $P_1$ through inverters 68 and 70, respectively, to generate a control signal $S_2$, a low-side driver 72 generates a driving signal SL from the control signal S2 to switch the low-side switch 524, and an OFF duty detector 74 detects the control signal $S_1$ to generate a reset signal $S_R$ to the phase detector 62 to reset the detection signal $S_D$. For simplicity, the adjustable one-shot circuit 56 hereof is identical to the one 26 of the regulator 20, as shown in FIG. 3.

In FIG. 5, the pulse width modulator 54 is identical to a conventional one and comprises an error amplifier 542 and a PWM comparator 544. The negative input of the error amplifier 542 is connected with the output voltage $V_{out}$ and the non-negative input is connected with a reference voltage $V_{REF}$, such that an error signal $S_{EA}$ is generated and connected to the non-negative input of the comparator 544 to be compared with a ramp signal $S_{RAMP}$ on the negative input of the comparator 544 so as to generate the PWM signal $P_1$.

As shown in FIG. 5, the phase detector 62 includes a comparator 622, an AND gate 624, and a D-type flip-flop 626. The non-negative input and negative input of the comparator 622 are connected to the phase node 523 and ground GND, respectively, to compare the voltages thereon so as to generate a comparison signal $S_C$. One input of the AND gate 624 is connected with the comparison signal $S_C$, and the other input is connected with the driving signal $S_U$ through a inverter 64, such that a signal $S_3$ is generated for the input C of the D-type flip-flop 626. The inputs D and R of the D-type flip-flop 626 are connected with a supply voltage VDD and the reset signal $S_R$, respectively, and the detection signal $S_D$ will be generated at the output Q. In addition, the OFF duty detector 74 includes a next clock generator 742 by which the control signal $S_1$ is delayed to be a next clock signal $S_N$, and an AND gate 744 connected with the control signal $S_1$ and delayed signal $S_N$ to generate the reset signal $S_R$.

Figure 6:
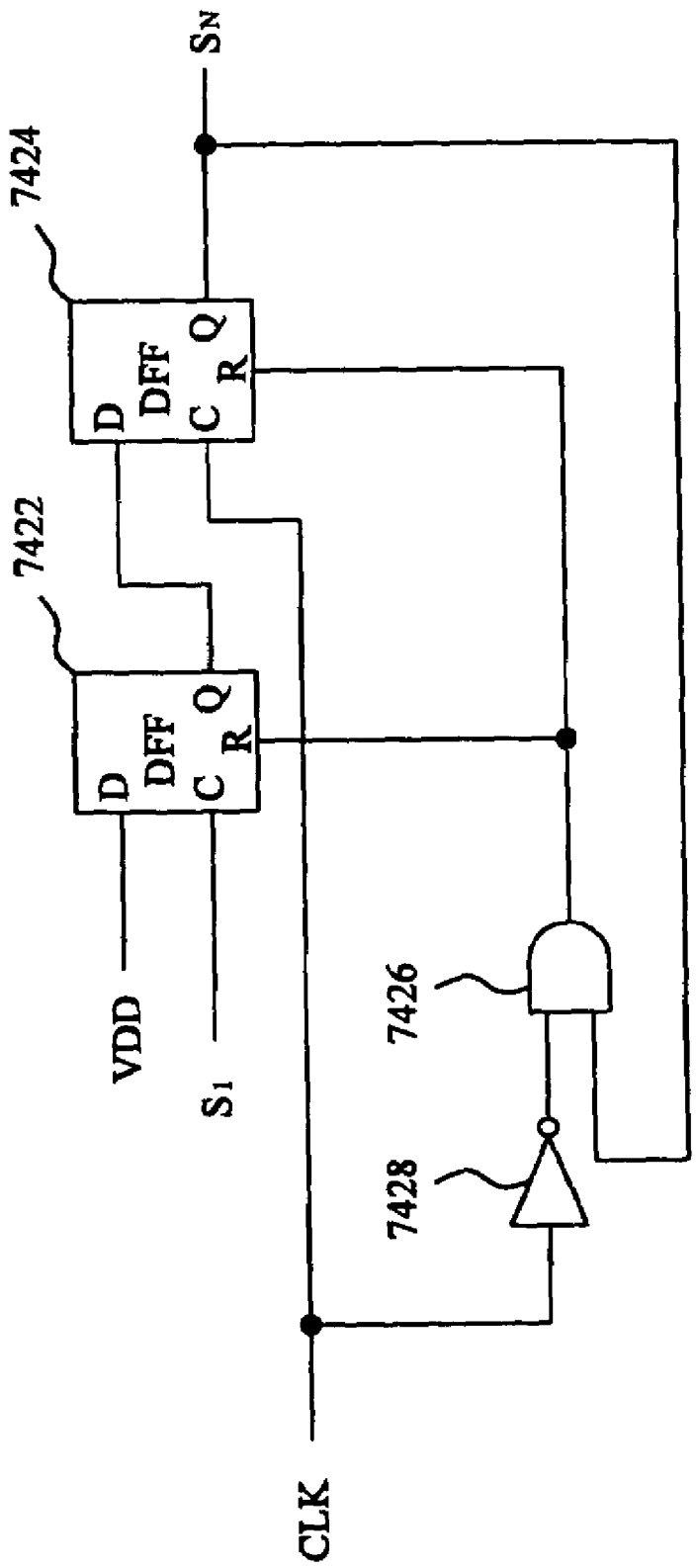
FIG. 6 shows one embodiment for the next clock generator shown in FIG. 5.

As shown in FIG. 6, the next clock generator 742 of the circuit 50 shown in FIG. 5 includes two D-type flip-flops 7422 and 7424 connected in series, an AND gate 7426, and an inverter 7428. The input D of the D-type flip-flop 7422 is connected with a supply voltage VDD, the input C is connected with the control signal $S_1$, and the output Q is connected to one input D of the D-type flip-flop 7424 whose another input C is connected with a clock CLK and whose output Q generates the next clock signal $S_N$. On the other hand, the clock CLK is connected to one input of the AND gate 7426 after inverted by the inverter 7428, the other input of the AND gate 7426 is connected with the next clock signal $S_N$, and its output is connected to the reset inputs R of the D-type flip-flops 7422 and 7424. The clock CLK is delayed by this circuit 742 to generate the next clock signal $S_N$.

Figure 7:
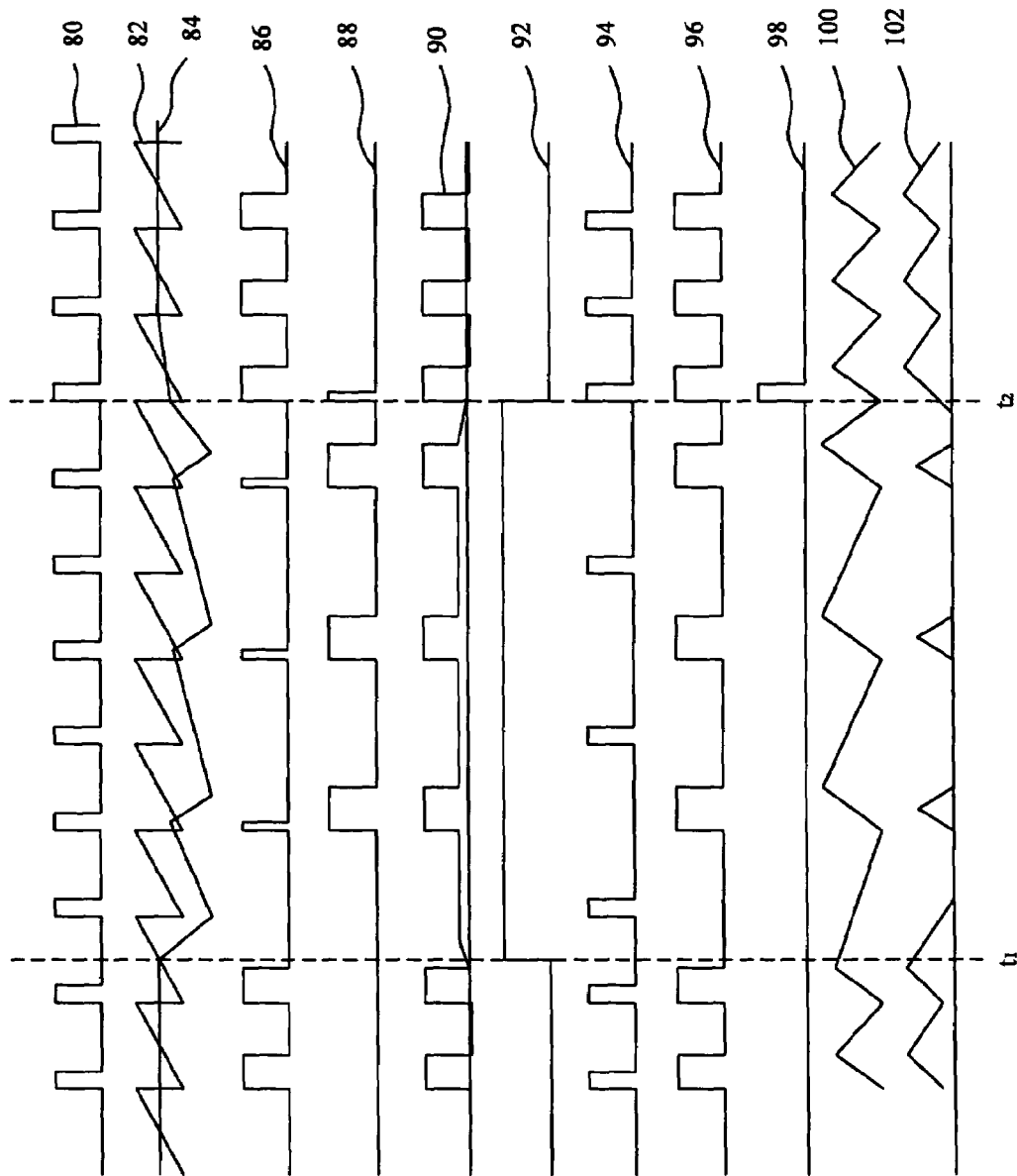
FIG. 7 shows a timing diagram of various signals of the voltage regulator shown in FIG. 5 when its loading varies.

FIG. 7 shows a timing diagram of various signals of the regulator 50, in which waveform 80 shows the clock CLK, waveform 82 shows the ramp signal $S_{RAMP}$, waveform 84 shows the error signal $S_{EA}$, waveform 86 shows the PWM signal $P_1$, waveform 88 shows the adjustable signal $S_{adj}$, waveform 90 shows the voltage on the phase node 523, waveform 92 shows the detection signal $S_D$, waveform 94 shows the next clock signal $S_N$, waveform 96 shows the driving signal $S_U$, waveform 98 shows the reset signal $S_R$, waveform 100 shows the output voltage $V_{out}$, and waveform 102 shows the inductor current $I_L$. In addition, the period from time $t_1$ to $t_2$ represents the duration the regulator 50 enters into a light loading. Referring to FIGS. 5 and 7, as the regulator 50 at heavy loading, the waveforms 88, 92 and 98 are all "0", which means that the adjustable one-shot circuit 56, the phase detector 62, and the OFF duty detector 74 are all inoperative and during that time period, the regulator 50 is operated by the pulse width modulator 54 responsive to the output voltage $V_{out}$ to generate the PWM signal $P_1$ to switch the high-side and low-side switches 522 and 524, as in a conventional regulator. When the regulator 50 enters into a light loading, however, as specified by $t_1$ in FIG. 7, the PWM signal $P_1$ from the pulse width modulator 54 will become extremely narrow and have a reduced frequency, as illustrated by the waveform 86. At that time, the regulator 50 is under the OFF duty, the voltage detected by the phase detector 62 on the phase node 523 is larger than 0, as illustrated by the waveform 90, and the driving signal $S_U$ is 0, as illustrated by the waveform 96. The AND gate 624 in the phase detector 62 receives the comparison signal $S_C$ and the driving signal $S_U$ inverted by the inverter 64, and generates the signal $S_3$ to the D-type flip-flop 626 to thereby generate the detection signal $S_D$, by which the adjustable one-shot circuit 56 is triggered and further the low-side switch 524 is blocked via the inverter 68, AND gate 66, and driver 72, so as to prevent the current from flowing from the phase node 523 to ground GND through the low-side switch 524 and thus resulting in power loss and efficiency reduction. The PWM signal $P_1$, input voltage $V_{in}$, and adjustable voltage $V_{adj}$ are used by the triggered adjustable one-shot circuit 56 to generate the adjustable signal $S_{adj}$, as illustrated by the waveform 88. This signal $S_{adj}$ will be subsequently processed by the OR gate 58 to generate the control signal $S_1$, upon which the driving signal $S_U$ will be generated by the driver 60 to turn on the high-side switch 522, such that the output voltage $V_{out}$ starts to be raised, as illustrated by the waveform 100. The control signal $S_1$ is detected by the OFF duty detector 74, the next clock generator 742 thereof will delay the control signal $S_1$ to generate the next clock signal $S_N$, as illustrated by the waveform 94. The AND gate 744 in the OFF duty detector 74 may determine the end point of the light loading operation of the regulator 50 according to the next clock signal $S_N$ and control signal $S_1$. As illustrated by the waveform 98, the next clock signal $S_N$ and control signal $S_1$ are both at high level at the time $t_2$ and consequently, the reset signal $S_R$ will be generated from the AND gate 744 to reset the phase detector 62 to end the light loading operation of the regulator 50. As illustrated by the waveform 96, during the light loading operation of the regulator 50, the output voltage 100 will be raised due to the charging of the inductor current 102 within the ON duty. Furthermore, this ON duty is larger than that of the PWM signal 86, and the width of the former is controlled by the magnitude of the adjustable signal $S_{adj}$ or adjustable voltage $V_{adj}$ and therefore, the number of switching the high-side switch 522 may be decreased, thereby reducing the switching loss and resulting in the efficiency improvement.

As shown by the embodiment asynchronous and synchronous switching mode voltage regulator circuits 20 and 50, the numbers of switching the switches of the output stages 22 and 52 at light loading of the regulator 20 and 50 are decreased and therefore each switching loss of them is reduced, i.e., the efficiency of them is improved.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An asynchronous switching mode voltage regulator comprising:
    an output stage connected between an input voltage and a reference potential for generating an output voltage, said output stage including a switch connected between said input voltage and a phase node, and an unidirectional current-conducting device connected between said phase node and reference potential;
    a pulse width modulator responsive to said output voltage for generating a PWM signal; and
    an adjustable one-shot circuit connected with an adjustable voltage for generating an adjustable signal at a light loading to adjust an ON duty of said switch.

2. The regulator according to claim 1, wherein said unidirectional current-conducting device comprises a diode.

3. The regulator according to claim 1, wherein said adjustable one-shot circuit comprises:
    a charger;
    a flip-flop connected with said PWM signal for generating said adjustable signal to control said charger to be charged and discharged;
    a charging current generator connected with said input voltage and adjustable voltage for providing a charging current to charge said charger to thereby generate a charger output; and
    a comparator for comparing said charger output with a reference voltage to generate a reset signal to reset said flip-flop.

4. The regulator according to claim 3, wherein said charging current generator comprises:
    a current source connected with said input voltage for generating a first current;
    a current mirror having a reference branch connected with said first current and a mirror branch for generating a mirrored current by mirroring said first current; and
    a current sink connected with said mirror branch and adjustable voltage for separating a second current from said mirrored current to thereby determine said charging current.

5. The regulator according to claim 4, wherein said first current is proportional to said input voltage.

6. The regulator according to claim 4, wherein said second current is proportional to said adjustable voltage.

7. The regulator according to claim 1, wherein said adjustable voltage is proportional to said output voltage.

8. A method for efficiency improvement of an asynchronous switching mode voltage regulator including an output stage connected between an input voltage and a reference potential for generating an output voltage, said output stage having a switch connected between said input voltage and a phase node, and an unidirectional current-conducting device connected between said phase node and reference potential, and a pulse width modulator responsive to said output voltage for generating a PWM signal, said method comprising the steps of:
    generating an adjustable signal upon an adjustable voltage at a light loading; and
    adjusting an ON duty of said switch by said adjustable signal.

9. The method according to claim 8, wherein said step of generating an adjustable signal comprises the steps of:
    triggering a flip-flop to generate a flip-flop output by said PWM signal;
    generating said adjustable signal in response to said flip-flop output;
    generating a charging current;
    charging a charger by said charging current and discharging said charger under control of said flip-flop output to thereby generate a charger output; and
    comparing said charger output with a reference voltage to generate a reset signal to reset said flip-flop.

10. The method according to claim 9, wherein said step of generating a charging current comprises the steps of:
    generating a first current proportional to said input voltage;
    generating a mirrored current by mirroring said first current; and
    separating a second current proportional to said adjustable voltage from said mirrored current for determining said charging current.

11. The method according to claim 8, further comprising controlling said adjustable voltage proportional to said output voltage.

12. A synchronous switching mode voltage regulator comprising:
    an output stage connected between an input voltage and a reference potential for generating an output voltage, said output stage including a high-side switch connected between said input voltage and a phase node, and a low-side switch connected between said phase node and reference potential;
    a pulse width modulator responsive to said output voltage for generating a PWM signal;
    a phase detector for detecting a voltage on said phase node to generate a detection signal to block said low-side switch at a light loading;
    an adjustable one-shot circuit connected with an adjustable voltage for generating an adjustable signal by triggered by said detection signal;
    a control signal responsive to said adjustable signal for adjusting an ON duty of said high-side switch at said light loading; and
    an OFF duty detector for resetting said phase detector when said regulator escapes from said light loading.

13. The regulator according to claim 12, wherein said phase detector comprises:
    a comparator for comparing said voltage on said phase node and reference potential to generate a comparison signal; and
    a flip-flop responsive to said control signal and comparison signal for generating said detection signal.

14. The regulator according to claim 12, wherein said adjustable one-shot circuit comprises:
- a charger;
- a flip-flop connected with said PWM signal for generating said adjustable signal to control said charger to be charged and discharged;
- a charging current generator connected with said input voltage and adjustable voltage for providing a charging current to charge said charger to thereby generate a charger output; and
- a comparator for comparing said charger output with a reference voltage to generate a reset signal to reset said flip-flop.

15. The regulator according to claim 14, wherein said charging current generator comprises:
- a current source connected with said input voltage for generating a first current;
- a current mirror having a reference branch connected with said first current and a mirror branch for generating a mirrored current by mirroring said first current; and
- a current sink connected with said mirror branch and adjustable voltage for separating a second current from said mirrored current to thereby determine said charging current.

16. The regulator according to claim 15, wherein said first current is proportional to said input voltage.

17. The regulator according to claim 15, wherein said second current is proportional to said adjustable voltage.

18. The regulator according to claim 12, wherein said OFF duty detector comprises:
- a next clock generator for generating a next clock signal by delaying said control signal; and
- a reset signal resulted from said control signal and next clock signal for resetting said phase detector.

19. The regulator according to claim 18, wherein said next clock generator comprises:
- a first flip-flop connected with said control signal for generating a first signal;
- a second flip-flop connected with a clock signal and said first signal for generating said next clock signal; and
- an AND gate connected with said next clock signal and an inverse of said clock signal for generating said reset signal to reset said first and second flip-flops.

20. A method for efficiency improvement of a synchronous switching mode voltage regulator including an output stage connected between an input voltage and a reference potential for generating an output voltage, said output stage having a high-side switch connected between said input voltage and a phase node, and a low-side switch connected between said phase node and reference potential, and a pulse width modulator responsive to said output voltage for generating a PWM signal, said method comprising the steps of:
- detecting a voltage on said phase node for generating a detection signal to block said low-side switch at a light loading;
- generating an adjustable signal upon said detection signal and an adjustable voltage;
- generating a control signal in response to said adjustable signal for adjusting an ON duty of said high-side switch at said light loading; and
- generating a reset signal for resetting said detection signal when said regulator escapes from said light loading.

21. The method according to claim 20, wherein said step of generating an adjustable signal comprises the steps of:
- triggering a flip-flop to generate a flip-flop output by said PWM signal;
- generating said adjustable signal in response to said flip-flop output;
- generating a charging current;
- charging a charger by said charging current and discharging said charger under control of said flip-flop output to thereby generate a charger output; and
- comparing said charger output with a reference voltage for generating said reset signal to reset said flip-flop.

22. The method according to claim 21, wherein said step of generating a charging current comprises the steps of:
- generating a first current proportional to said input voltage;
- generating a mirrored current by mirroring said first current; and
- separating a second current proportional to said adjustable voltage from said mirrored current for determining said charging current.

23. The method according to claim 20, further comprising controlling said adjustable voltage proportional to said output voltage.

24. The method according to claim 20, wherein said step of generating a reset signal comprises the steps of:
- generating a next clock signal by delaying said control signal; and
- generating said reset signal upon said control signal and next clock signal.

* * * * *